UNITED STATES PATENT OFFICE.

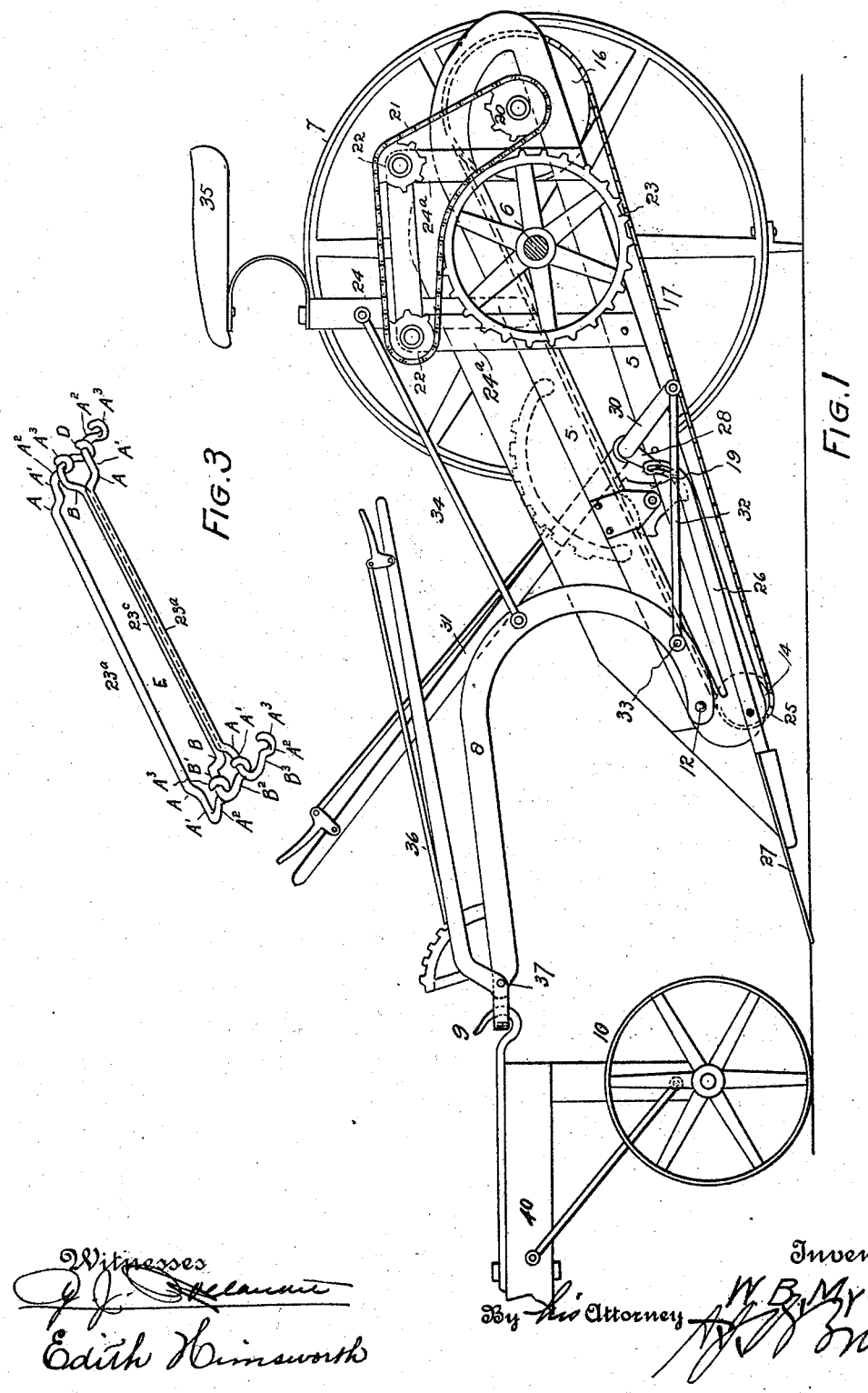

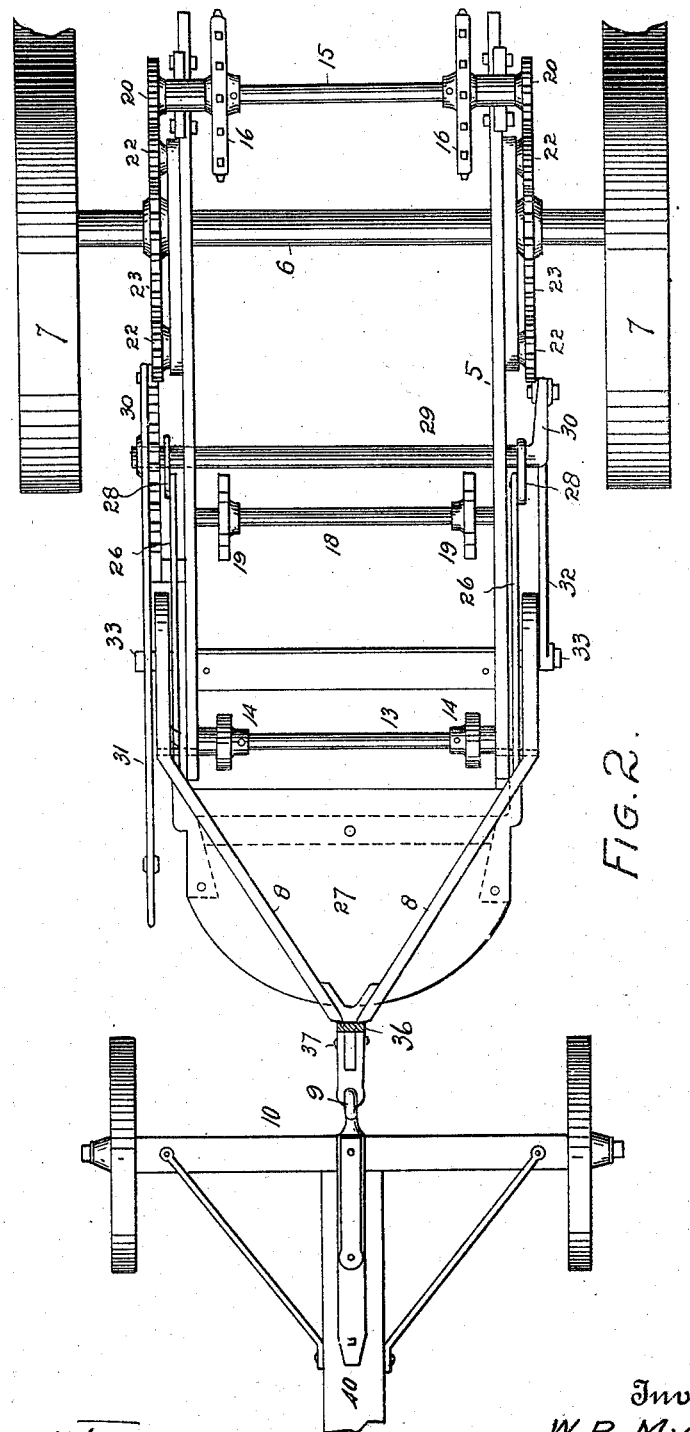

WALKER B. MYERS, OF CATHERIN, COLORADO, ASSIGNOR OF FIVE-EIGHTHS TO EDWARD STAUFFACHER, OF SAME PLACE, AND LINDSAY S. STREPEY, OF BASALT, COLORADO.

POTATO-DIGGER.

SPECIFICATION forming part of Letters Patent No. 576,322, dated February 2, 1897.

Application filed May 18, 1896. Serial No. 592,091. (No model.)

*To all whom it may concern:*

Be it known that I, WALKER B. MYERS, a citizen of the United States of America, residing at Catherin, in the county of Garfield and State of Colorado, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in potato-diggers; and it consists of the features hereinafter described and claimed, all of which will be fully understood by reference to the accompanying drawings, in which is illustrated an embodiment thereof.

In the drawings, Figure 1 is a side elevation of the machine. Fig. 2 is a top or plan view of the same. Fig. 3 is a fragmentary view of the elevator-chain, the parts being shown on a larger scale.

Similar reference-characters indicating corresponding parts in all the views, let the numeral 5 designate the main frame, in which is journaled the axle 6, mounted on the drive-wheels 7. As shown in the drawings, the frame 5 consists of two iron bars cast with a central opening, one bar being located on each side of the machine. These frame-bars are quite narrow in front and increase in width toward the rear. To the forward extremities of the frame-bars are pivoted at 12 the curved draft-bars 8, whose forward extremities are connected at 9 with a suitable truck 10. Journaled in the forward extremities of the frame-bars is a shaft 13, upon which are mounted small wheels 14. On these frame-bars, near their rear extremities, is journaled a shaft 15, to which are made fast two sprocket-wheels 16, located between the frame-bars and in line with the wheels 14. The wheels 14 and 16 support the elevator or carrier 17. Intermediate the shafts 13 and 15 is located a shaft 18, carrying diamond-shaped sprockets 19, which engage the elevator and produce sufficient agitation to separate the dirt from the potatoes.

The shaft 15 projects beyond or outside of the frame-bars on each side of the machine. To these projecting extremities are made fast two sprocket-wheels 20, around which passes a sprocket-chain 21, engaging idlers 22, mounted on uprights 24, attached to the frame-bars 5. The chain 21 also engages propelling-sprockets 23, mounted on the drive-wheel axle.

Fulcrumed on the forward extremities of the frame-bars 5, at a point 25, are two lever-arms 26, to which is attached the plow 27, located forward of the lever-fulcrum. The rear extremities of the lever-arms 26 are connected with short cranks 28, attached to a rock-shaft 29, journaled in the frame 5. This rock-shaft is provided with two cranks 30, one being located at each extremity of the shaft. To one extremity of this shaft is attached a lever 31, which is fast on the shaft, its lower extremity being continued or extended to form one of the cranks 30. To the lower extremities of the cranks 30 are respectively pivoted the rear extremities of two connecting-rods 32, one only being shown. The forward extremities of these rods are pivoted to the curved draft-bars 8, as shown at 33. By means of the lever 31 the framework of the machine (which is pivoted on the axle 6) is raised and lowered at pleasure. The position or inclination of the plow 27 is also regulated by the movement of this lever by virtue of the construction heretofore described. The draft-bars 8 are connected with the uprights 24 by means of rods 34, whose extremities are pivoted to the connected parts.

The seat 35 is supported on a cross-bar connecting the uprights 24.

The position of the draft-bars is regulated by means of a lever 36, fulcrumed on the forward extremities of the draft-bars, as shown at 37, its forward extremity being apertured to receive a hook 9 on the truck 10. The elevator 17 is composed of transverse rods 23$^a$ and 23$^c$. Near their extremities the rods 23$^a$ are formed with bends A, whereby the portion of the rods between the bends is made to occupy a higher plane than the extremities A', which are provided with right-angular extensions A², terminating in hooks A³. The rods 23ᶜ are provided with bends B, whereby the portion of the rods between the bends is made to occupy a lower plane than the extremities B', which are formed with right-angular extensions B², terminating in hooks B³. The hook of each rod engages the extremity A² or B² (as the case may be) of the other. The upward bend of the arms 23ᵃ, together with the downward bend of the rods 23ᶜ, forms pockets E, which retain the potatoes as they are carried upward on the elevator, which occupies an inclined position. (See Fig. 1.)

In operating the machine a team of horses is hitched to a suitable tongue 40, attached to the truck. The machine is made to straddle a row of potatoes. The plow 27 is set in the proper position and the frame 5 given the proper inclination through the instrumentality of the lever 31, the rock-shaft 29, the lever-arms 26, and the connecting-rods 32. The team being driven forward, the plow digs the potatoes and throws them, together with the dirt, upon the endless elevator or carrier 17. This elevator is actuated from the axle 6 through the instrumentality of the sprocket-wheels 23, the chains 21, the sprockets 20, and the shaft 15. The potatoes are carried upward by the elevator, which is agitated by the diamond-shaped sprockets 19. This agitation facilitates the separation of the dirt from the potatoes, which finally fall from the elevator in a row at the rear of the machine.

Having thus described my invention, what I claim is—

1. In a potato-digger, the combination with the frame, the axle journaled therein, the drive-wheels, the draft-bars and the truck, of the levers 26 fulcrumed in the forward part of the frame, the plow or digger attached to the levers forward of the fulcrum, a rock-shaft having cranks attached to the rear extremities of the levers, and a suitable hand-lever attached to the rock-shaft for regulating the inclination of the plow, substantially as described.

2. In a potato-digger, the combination with the drive-wheels, the axle, the frame pivoted on the axle, the truck, and the draft-bars connecting the truck with the forward extremity of the frame, of the levers 26 fulcrumed on the front part of the frame, the plow attached to the forward extremities of the levers, the rock-shaft having cranks connected with the rear extremities of the levers, rods 32 connecting the draft-bars with other cranks on the rock-shaft, and a hand-lever attached to the rock-shaft, substantially as described.

3. In a potato-digger the combination with the frame, the axle journaled therein, the drive-wheels, the draft-bars and the truck, of the levers 26 fulcrumed in the forward part of the frame, the plow or digger attached to the levers forward of the fulcrum, a rock-shaft having cranks attached to the rear extremities of the levers, a suitable hand-lever attached to the rock-shaft for regulating the inclination of the plow, the elevator suitably supported on the frame, a shaft 15 journaled in the rear extremity of the frame, sprocket-wheels fast on said shaft and engaging the elevator, the sprockets 20 attached to the shaft 15, chains 21 engaging the sprockets 20 and further supported by idlers on the frame, sprockets on the axle engaging the chains 21, and a shaft carrying diamond-shaped agitating-sprockets engaging the elevator, substantially as described.

In testimony whereof I affix my signature in the presence of two witnesses.

WALKER B. MYERS.

Witnesses:
J. W. CURTIS,
EDWARD STAUFFACHER.